(12) United States Patent
Yoon et al.

(10) Patent No.: US 12,351,968 B2
(45) Date of Patent: Jul. 8, 2025

(54) LAUNDRY APPLIANCE DRUM MOTOR FAULT DETECTION USING A CAMERA AND ARTIFICIAL INTELLIGENCE

(71) Applicant: Haier US Appliance Solutions, Inc., Wilmington, DE (US)

(72) Inventors: Je Kwon Yoon, Seongnam Gyeonggi (KR); Hyoyeol Maeng, Bucheon-si (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 757 days.

(21) Appl. No.: 17/155,684

(22) Filed: Jan. 22, 2021

(65) Prior Publication Data

US 2022/0235506 A1   Jul. 28, 2022

(51) Int. Cl.
| | | |
|---|---|---|
| *D06F 33/47* | (2020.01) | |
| *D06F 33/44* | (2020.01) | |
| *D06F 34/04* | (2020.01) | |
| *D06F 34/14* | (2020.01) | |
| *D06F 103/24* | (2020.01) | |
| *D06F 105/28* | (2020.01) | |
| *D06F 105/52* | (2020.01) | |
| *D06F 105/54* | (2020.01) | |
| *D06F 105/56* | (2020.01) | |

(Continued)

(52) U.S. Cl.
CPC .............. *D06F 33/47* (2020.02); *D06F 33/44* (2020.02); *D06F 34/04* (2020.02); *D06F 34/14* (2020.02); *G06T 7/0002* (2013.01); *D06F 2103/24* (2020.02); *D06F 2105/28* (2020.02); *D06F 2105/52* (2020.02); *D06F 2105/54* (2020.02); *D06F 2105/56* (2020.02); *G06T 2207/20081* (2013.01); *G06T 2207/20084* (2013.01); *H04N 7/183* (2013.01)

(58) Field of Classification Search
CPC .......... D06F 33/47; D06F 33/44; D06F 34/04; D06F 34/14; D06F 2103/24; D06F 2105/28; D06F 2105/52; D06F 2105/54; D06F 2105/56; D06F 58/50; D06F 2103/00; D06F 2103/64; D06F 2105/62; G06T 7/0002; G06T 2207/20081; G06T 2207/20084; G06T 7/0004; H04N 7/183
See application file for complete search history.

(56) References Cited

U.S. PATENT DOCUMENTS

| | | | |
|---|---|---|---|
| 8,782,922 B2 | 7/2014 | May et al. | |
| 9,222,212 B2 | 12/2015 | Johansson | |
| 10,392,741 B1 * | 8/2019 | Adamczyk | .............. D06F 58/06 |

(Continued)

FOREIGN PATENT DOCUMENTS

| | | |
|---|---|---|
| EP | 3309285 A1 | 4/2018 |
| EP | 3470567 B1 | 7/2020 |
| KR | 2016/0084698 A | 7/2016 |

*Primary Examiner* — Joseph L. Perrin
(74) *Attorney, Agent, or Firm* — Dority & Manning, P.A.

(57) ABSTRACT

A laundry appliance includes a camera for determining whether the drum is rotating during operation of the appliance. A controller is operably coupled to the camera. The controller is configured for obtaining one or more images of the drum during operation of the appliance. An artificial intelligence image recognition process is used to perform image classification and determine whether a drum rotation fault has occurred. In the event of a drum rotation fault, operation of the laundry appliance is adjusted.

17 Claims, 3 Drawing Sheets

(51) Int. Cl.
*G06T 7/00* (2017.01)
*H04N 7/18* (2006.01)

(56) References Cited

U.S. PATENT DOCUMENTS

2021/0025097 A1\* 1/2021 Lee .................. G06V 20/52
2021/0125210 A1\* 4/2021 Christensen ....... G06Q 30/0206
2021/0334641 A1\* 10/2021 Kim .................. D06F 34/05

\* cited by examiner

LAUNDRY APPLIANCE DRUM MOTOR FAULT DETECTION USING A CAMERA AND ARTIFICIAL INTELLIGENCE

FIELD OF THE INVENTION

The present subject matter relates generally to laundry appliances, or more specifically, to systems and methods for controlling operation of the appliance based on operation of a drum motor, as indicated by rotation of the drum.

BACKGROUND OF THE INVENTION

Laundry appliances generally include a cabinet with a drum rotatably mounted therein. During operation, a motor rotates the drum, e.g., to tumble articles located within a chamber defined by the drum. Dryer appliances in particular also generally include a heater assembly that passes heated air through the chamber in order to dry moisture-laden articles positioned therein. Typically, in a vented system, an air handler or blower is used to urge the flow of heated air from chamber, through a trap duct, and to the exhaust duct where it is exhausted from the dryer appliance. Other dryer appliances employ a heat pump for circulating air in a closed loop. Washer appliances likewise include a rotating drum for agitating articles within the washing chamber to clean them.

Notably, the purpose of laundry appliances is unfulfilled in the absence of drum rotation. For example, a dryer appliance is defeated when a cycle fails to dry or only partially dries a load of clothing. Washer appliances similarly provide inadequate agitation of articles in the absence of drum rotation. Leaving clothes inadequately laundered. But lack of drying or cleaning can be caused my numerous different faults, such as triggering, intentionally or unintentionally, of the door switch or miswiring faults. Existing appliances lack tools for diagnosing the source of these problems.

Accordingly, a laundry appliance including a means of monitoring rotation of the drum and recording faults is desirable. More specifically, a system and method for drum rotation with a camera using a machine learning image recognition process to determine drum rotation is desirable.

BRIEF DESCRIPTION OF THE INVENTION

Advantages of the invention will be set forth in part in the following description, or may be apparent from the description, or may be learned through practice of the invention.

In one exemplary embodiment, a laundry appliance is provided, including a cabinet, a drum rotatably mounted within the cabinet, the drum defining a chamber for receipt of clothes, a camera for monitoring the drum position and direction of rotation; and a controller operably coupled to the camera. The controller may be configured to obtain one of more images of the drum using the camera, perform image classification using a machine learning image recognition process, determine whether the image classification indicates a drum rotation fault, and adjust at least one operating parameter of the laundry appliance if a drum rotation fault is detected.

In another exemplary embodiment, a method of operating a laundry appliance is provided. The laundry appliance includes a drum rotatably mounted within a cabinet, the drum defining a chamber for receipt of clothes, and a camera for monitoring rotation of the drum. The method includes obtaining one of more images of the drum using the camera, performing image classification using a machine learning image recognition process, determining whether the image classification indicates a drum rotation fault, and adjusting at least one operating parameter of the laundry appliance if a drum rotation fault is detected.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
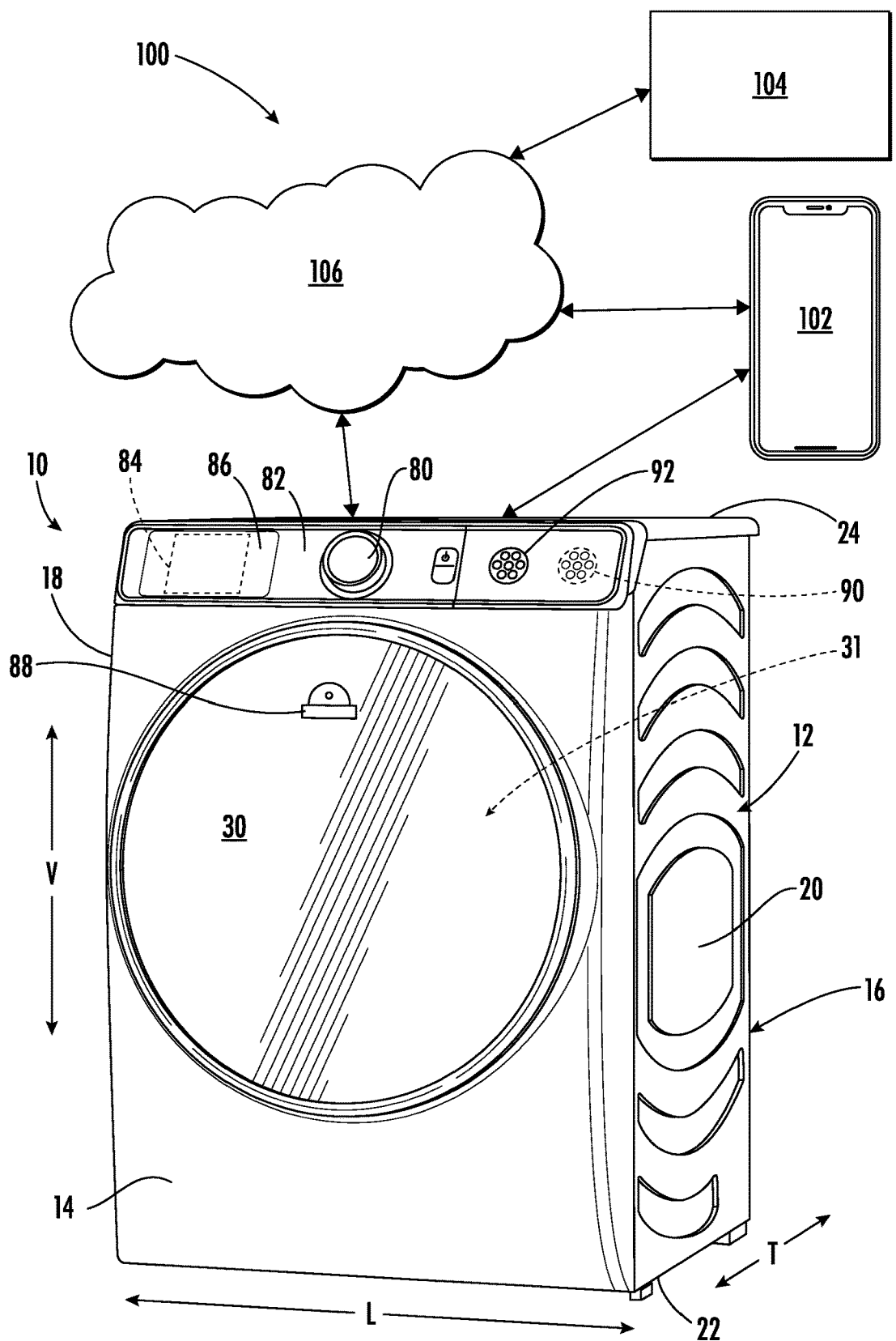
FIG. 1 provides a perspective view of a dryer appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
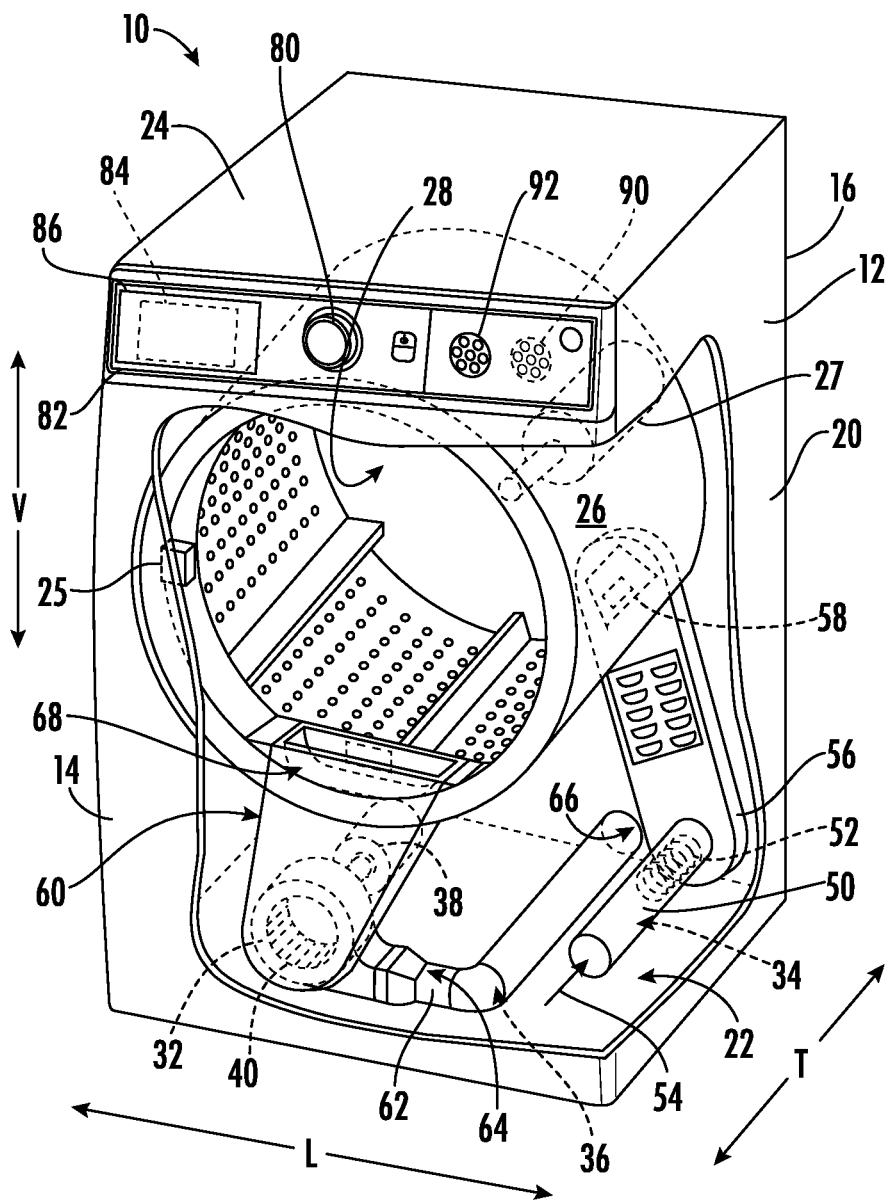
FIG. 2 provides a perspective view of the exemplary dryer appliance of FIG. 1 with portions of a cabinet of the exemplary dryer appliance removed to reveal certain components of the exemplary dryer appliance.

FIG. 1 illustrates a dryer appliance 10 according to an exemplary embodiment of the present subject matter. FIG. 2 provides another perspective view of dryer appliance 10 with a portion of a housing or cabinet 12 of dryer appliance 10 removed in order to show certain components of dryer appliance 10. While described in the context of a specific embodiment of a dryer appliance, using the teachings disclosed herein it will be understood that dryer appliance 10 is provided by way of example only. Other laundry appliances, including alternative dryer appliances, front or top-loaded washer appliances, or combination washer/dryer appliances having different appearances and different features may also be utilized with the present subject matter as well.

Dryer appliance 10 defines a vertical direction V, a lateral direction L, and a transverse direction T. The vertical direction V, lateral direction L, and transverse direction T are mutually perpendicular and form an orthogonal direction system. Cabinet 12 includes a front panel 14 and a rear panel 16 spaced apart along the transverse direction T, a first side panel 18 and a second side panel 20 spaced apart along the lateral direction L, and a bottom panel 22 and a top cover 24 spaced apart along the vertical direction V. Within cabinet 12 is a container or drum 26 which defines a chamber 28 for receipt of articles, e.g., clothing, linen, etc., for drying. Drum 26 extends between a front portion and a back portion, e.g., along the transverse direction T. In example embodiments, drum 26 is rotatable, e.g., about an axis that is parallel to the transverse direction T, within cabinet 12. Rotation of drum 26 is driven by drum motor 27. A door 30 is rotatably mounted to cabinet 12 for providing selective access to drum 26.

As best shown in FIG. 2, an air handler 32, such as a blower or fan, may be provided to motivate an airflow (not shown) through an entrance air passage 34 and an air exhaust passage 36. Specifically, air handler 32 may include a motor 38 which may be in mechanical communication with a blower fan 40, such that motor 38 rotates blower fan 40. Air handler 32 is configured for drawing air through chamber 28 of drum 26, e.g., in order to dry articles located therein, as discussed in greater detail below. In alternative example embodiments, dryer appliance 10 may include an additional motor (not shown) for rotating fan 40 of air handler 32 independently of drum 26.

Drum 26 may be configured to receive heated air that has been heated by a heating assembly 50, e.g., in order to dry damp articles disposed within chamber 28 of drum 26. Heating assembly 50 includes a heater 52 that is in thermal communication with chamber 28. For instance, heater 52 may include one or more electrical resistance heating elements or gas burners, for heating air being flowed to chamber 28. As discussed above, during operation of dryer appliance 10, motor 38 rotates fan 40 of air handler 32 such that air handler 32 draws air through chamber 28 of drum 26. In particular, ambient air enters an air entrance passage defined by heating assembly 50 via an entrance 54 due to air handler 32 urging such ambient air into entrance 54. Such ambient air is heated within heating assembly 50 and exits heating assembly 50 as heated air. Air handler 32 draws such heated air through an air entrance passage 34, including inlet duct 56, to drum 26. The heated air enters drum 26 through an outlet 58 of inlet duct 56 positioned at a rear wall of drum 26.

Within chamber 28, the heated air can remove moisture, e.g., from damp articles disposed within chamber 28. This internal air flows in turn from chamber 28 through an outlet assembly positioned within cabinet 12. The outlet assembly generally defines an air exhaust passage 36 and includes a trap duct 60, air handler 32, and an exhaust conduit 62. Exhaust conduit 62 is in fluid communication with trap duct 60 via air handler 32. More specifically, exhaust conduit 62 extends between an exhaust inlet 64 and an exhaust outlet 66. According to the illustrated embodiment, exhaust inlet 64 is positioned downstream of and fluidly coupled to air handler 32, and exhaust outlet 66 is defined in rear panel 16 of cabinet 12. During a dry cycle, internal air flows from chamber 28 through trap duct 60 to air handler 32, e.g., as an outlet flow portion of airflow. As shown, air further flows through air handler 32 and to exhaust conduit 62.

The internal air is exhausted from dryer appliance 10 via exhaust conduit 62. In some embodiments, an external duct (not shown) is provided in fluid communication with exhaust conduit 62. For instance, the external duct may be attached (e.g., directly or indirectly attached) to cabinet 12 at rear panel 16. Any suitable connector (e.g., collar, clamp, etc.) may join the external duct to exhaust conduit 62. In residential environments, the external duct may be in fluid communication with an outdoor environment (e.g., outside of a home or building in which dryer appliance 10 is installed). During a dry cycle, internal air may thus flow from exhaust conduit 62 and through the external duct before being exhausted to the outdoor environment.

In exemplary embodiments, trap duct 60 may include a filter portion 68 which includes a screen filter or other suitable device for removing lint and other particulates as internal air is drawn out of chamber 28. The internal air is drawn through filter portion 68 by air handler 32 before being passed through exhaust conduit 62. After the clothing articles have been dried (or a drying cycle is otherwise completed), the clothing articles are removed from drum 26, e.g., by accessing chamber 28 by opening door 30. The filter portion 68 may further be removable such that a user may collect and dispose of collected lint between drying cycles.

One or more selector inputs 80, such as knobs, buttons, touchscreen interfaces, etc., may be provided on a front control panel 82 and may be in communication with a processing device or controller 84. Signals generated in controller 84 operate motor 38, heating assembly 50, and other system components in response to the position of selector inputs 80. Additionally, a display 86, such as an indicator light or a screen, may be provided on front control panel 82. Display 86 may be in communication with controller 84 and may display information in response to signals from controller 84.

As used herein, "processing device" or "controller" may refer to one or more microprocessors or semiconductor devices and is not restricted necessarily to a single element. The processing device can be programmed to operate dryer appliance 10. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations. For certain embodiments, the instructions include a software package configured to operate appliance 10 and execute certain cycles or operating modes.

In addition, referring again to FIG. 1, dryer appliance 10 may generally include an external communication system 100 which is configured for enabling the user to interact with dryer appliance 10 using a remote device 102. Specifically, according to an exemplary embodiment, external communication system 100 is configured for enabling communication between a user, an appliance, and a remote server 104. According to exemplary embodiments, dryer appliance 10 may communicate with a remote device 102 either directly (e.g., through a local area network (LAN), Wi-Fi, Bluetooth, etc.) or indirectly (e.g., via a network 106), as well as with a remote server, e.g., to receive notifications, provide confirmations, input operational data, transmit sound signals and sound signatures, etc.

In general, remote device 102 may be any suitable device for providing and/or receiving communications or commands from a user. In this regard, remote device 102 may include, for example, a personal phone, a tablet, a laptop computer, or another mobile device. In addition, or alternatively, communication between the appliance and the user may be achieved directly through an appliance control panel (e.g., control panel 160). In general, network 106 can be any type of communication network. For example, network 106 can include one or more of a wireless network, a wired network, a personal area network, a local area network, a wide area network, the internet, a cellular network, etc. In general, communication with network may use any of a variety of communication protocols (e.g., TCP/IP, HTTP, SMTP, FTP), encodings or formats (e.g. HTML, XML), and/or protection schemes (e.g., VPN, secure HTTP, SSL).

External communication system 100 is described herein according to an exemplary embodiment of the present subject matter. However, it should be appreciated that the exemplary functions and configurations of external communication system 100 provided herein are used only as examples to facilitate description of aspects of the present subject matter. System configurations may vary, other communication devices may be used to communicate directly or indirectly with one or more appliances, other communication protocols and steps may be implemented, etc. These variations and modifications are contemplated as within the scope of the present subject matter.

In some embodiments, dryer appliance 10 also includes one or more sensors that may be used to facilitate improved operation of dryer appliance. For example, dryer appliance 10 may include one or more temperature sensors which are generally operable to measure internal temperatures in dryer appliance 10 and/or one or more airflow sensors which are generally operable to detect the velocity of air (e.g., as an air flow rate in meters per second, or as a volumetric velocity in cubic meters per second) as it flows through the appliance 10. In some embodiments, controller 84 is configured to vary operation profiles of heating assembly 50 based on one or more temperatures detected by the temperature sensors or air flow measurements from the airflow sensors.

Referring now specifically to FIGS. 1 and 2, dryer appliance 10 may further include a camera 88 that is generally positioned and configured for obtaining images of drum 26 within chamber 28 of dryer appliance. Specifically, according to the illustrated embodiment, door 30 of dryer appliance 10 comprises a window 31. According to the illustrated exemplary embodiment, a camera 88 that is mounted to window 31. Specifically, camera 88 is mounted such that is faces toward drum 26. In this manner, camera 88 can take images or video of drum 26. Camera 88 may be mounted to an upper portion of window 31 to minimize risk of interference from laundry articles within chamber 28. In other embodiments, camera 88 may be positioned at a central location on window 31 depending on the configuration of the dryer appliance. In alternative embodiments, for some laundry appliances, such as front-loading washers, camera 88 may be mounted to a top portion of a gasket between the door and cabinet. Those of ordinary skill in the art will recognize that alternative suitable camera locations are also available. It should be appreciated that camera 88 may include any suitable number, type, size, and configuration of camera 88 for obtaining images of drum 26. Although an exemplary camera 88 is illustrated and described herein, it should be appreciated that according to alternative embodiments, dryer appliance 10 may include any other camera or system of imaging devices for obtaining images of drum 26. One of ordinary skill in the art will recognize that, in other embodiments, two or more cameras could alternatively be employed to capture images of drum 26 for comparison with other images or with each, as discussed below, and that such an embodiment would be within the scope of the invention.

So positioned, camera 88 may obtain one or more images or videos of drum 26 within chamber 28, as described in more detail below. Referring still to FIG. 2, dryer appliance 10 may further include a tub light 25 that is positioned within cabinet 12 or chamber 28 for selectively illuminating chamber 28 and drum 26 positioned therein.

Notably, controller 84 of dryer appliance 10 (or any other suitable dedicated controller) may be communicatively coupled to camera 88, tub light 25, and other components of dryer appliance 10. As explained in more detail below, controller 84 may be programmed or configured for analyzing the images obtained by camera 88, e.g., in order to determine the operational characteristics of drum 26, and by extension, characteristics of drum motor 27, and may use this information to make informed decisions regarding the operation of dryer appliance 10.

While described in the context of a specific embodiment of dryer appliance 10, using the teachings disclosed herein it will be understood that dryer appliance 10 is provided by way of example only. Other dryer appliances or laundry appliances having different configurations, different appearances, and/or different features may also be utilized with the present subject matter as well. For example, the present subject matter may be employed in vented dryer appliances utilizing gas or electric heaters or heat pump-based dryer appliances that circulate air in a closed loop. Other exemplary laundry appliances may include, for example, front- or top-loading washer appliances or combination washer/dryer appliances. Moreover, the systems and methods described herein may be used to monitor drum rotation in any other suitable appliance or appliances.

Now that the construction of dryer appliance 10 and the configuration of controller 84 according to exemplary embodiments have been presented, an exemplary method 200 of operating a dryer appliance will be described. Although the discussion below refers to the exemplary method 200 of operating dryer appliance 10, one skilled in the art will appreciate that the exemplary method 200 is applicable to the operation of a variety of other laundry appliances. In exemplary embodiments, the various method steps as disclosed herein may be performed by controller 84 or a separate, dedicated controller.

Figure 3:
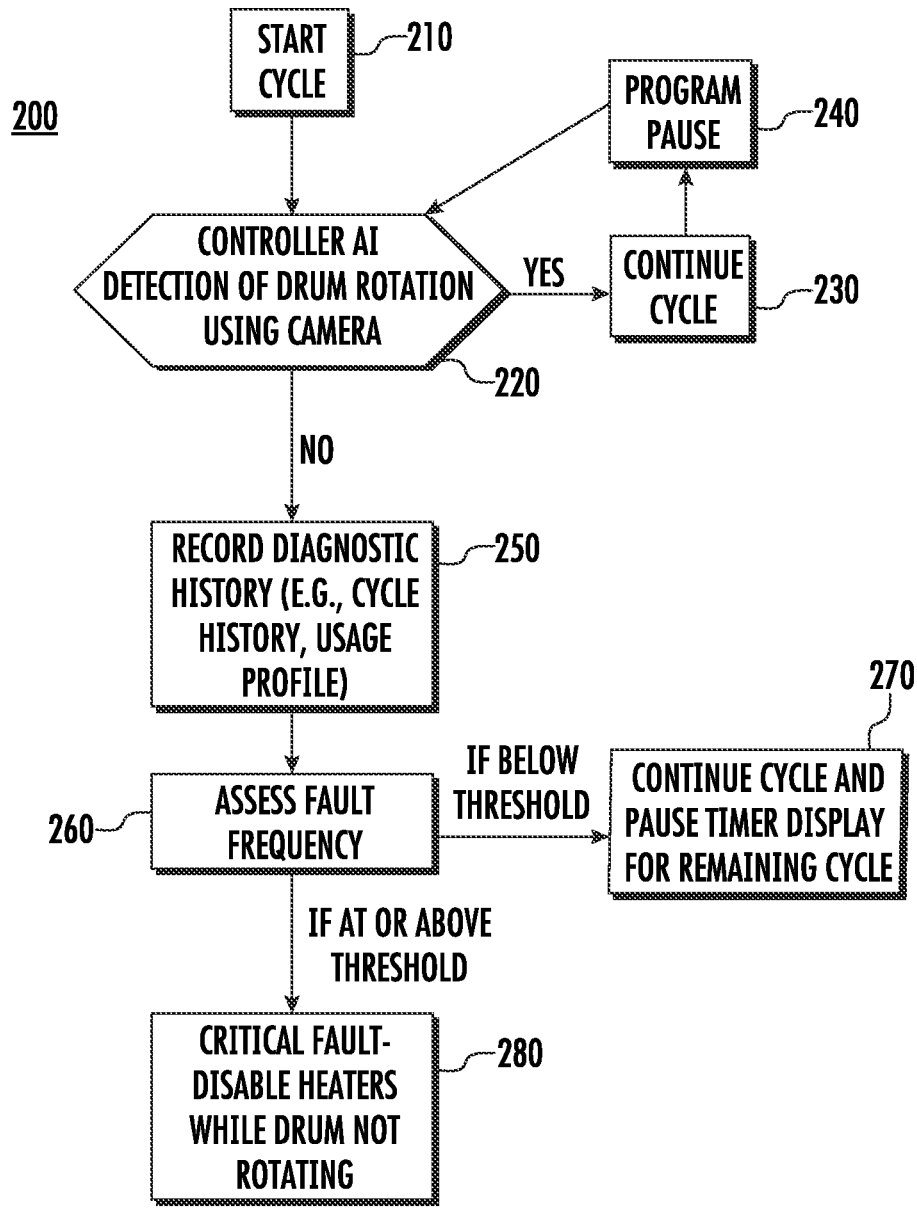
FIG. 3 illustrates a method for using images from a laundry appliance camera to determine if appliance's drum is rotating and to adjust operating parameter of the appliance in response to a fault.

Referring generally to FIG. 3, a method of operating a laundry appliance, such as a dryer appliance, is provided. According to exemplary embodiments, method 200 includes, at step 210, the laundry appliance begins a wash or dry cycle, thereby actuating the drum motor and rotating the drum. During operation of the laundry appliance at step 210, the controller may initiate detection of the drum rotation status. Such detection may not be limited strictly to whether the drum is rotating, but to the direction of rotation (i.e., clockwise or counter-clockwise) as well. For example, the controller may obtain one or more images of the drum using the camera. In some embodiments, use of the camera to obtain images may be accompanied by sending a signal to the tub light to turn on, thus providing sufficient light for the camera to operate. In other embodiments, a different lighting source, for example a flash light on the camera itself, may be employed. In yet other embodiments, activation of the tub light or other light source may depend on input from a light sensor within the chamber which would enable the controller to selectively determine whether sufficient light levels exist within the chamber to render lighting unnecessary, as would be understood by those skilled in the art. Additionally, or alternatively, assessment of the adequacy of the current light level within the chamber may be performed using image processing, wherein an image is taken without the light source and the resulting image is analyzed or compared to other images to assess, for example, the level of saturation in the image. In addition, step 220 may include performing image classification of the one or more images obtained from the camera to determine the drum rotation status.

As used herein, the terms image classification, image recognition process, object detection, movement detection, and similar terms may be used generally to refer to any suitable method of observation, analysis, image decomposition, feature extraction, etc. of one or more images or videos taken within a chamber of a dryer or other laundry appliance. In this regard, the image recognition process may use any suitable artificial intelligence ("AI") technique, for example, any suitable machine learning technique, or for example, any suitable deep learning technique. It should be appreciated that any suitable image recognition software or process may be used to analyze images taken by camera 88 and controller 84 may be programmed to perform such processes and take corrective action.

According to an exemplary embodiment, controller 84 may implement a form of image recognition called region based convolutional neural network ("R-CNN") image recognition. Generally speaking, R-CNN may include taking an input image and extracting region proposals that include a potential object, such as drum 26. In this regard, a "region proposal" may be regions in an image that could belong to a particular object, such as a drum at a particular degree of rotation. A convolutional neural network is then used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, step 220 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments, controller 84 may implement a form of image recognition called convolutional neural network ("CNN") image recognition. Generally speaking, CNN may include taking an input image and using a convolutional neural network to identify unique signatures in the image. According to still other embodiments, the image recognition process may use any other suitable neural network process. For example, the image recognition process may include the use of temporal convolutions ("T-CNN") and other types of deep feature extraction techniques. In addition, a K-means algorithm may be used. Other image recognition processes are possible and within the scope of the present subject matter.

It should be appreciated that any other suitable image recognition process may be used while remaining within the scope of the present subject matter. For example, step 220 of method 200 may include using a deep belief network ("DBN") image recognition process. A DBN image recognition process may generally include stacking many individual unsupervised networks that use each network's hidden layer as the input for the next layer. According to still other embodiments, step XXX may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present subject matter.

Any other suitable image classification technique may be used according to alternative embodiments. For example, various transfer techniques may be used, but use of such techniques is not required. If using transfer techniques learning, a neural network architecture may be pretrained such as VGG16/VGG19/ResNet50 with a public dataset then the last layer may be retrained with an appliance specific dataset.

In addition, or alternatively, the image recognition process may detect rotation of the drum or other events that depend on comparison of initial conditions. For example, an initial image may be subtracted from an image obtained while the dryer appliance is in operation and the drum is intended to be rotating in a given direction. The subtracted image may be used to train a neural network with three classes: clockwise rotation/counter-clockwise rotation/no rotation. If not using any transfer learning VGG16 may be the neural net architecture of choice. In addition, or alternatively, two images may be stacked, e.g., the initial image of the drum position and direction, if applicable, prior to initiating a cycle on the top of the image and the image while drying on the bottom of the image. In other words, according to exemplary embodiments, two images could be concatenated in any suitable manner and order. Moreover, according to alternative embodiments, two or more images could be combined by subtracting two images or modifying such images in any other suitable manner. This combined image may be used in a similar way to train a neural network with three classes: clockwise rotation/counter-clockwise rotation/ no rotation. If detection of rotation events does not require a comparison from the initial conditions, image combination may be avoided.

Step 220 further includes determining whether the image classification indicates that the drum is rotating and in what direction. Based on the classification of the one or more images obtained by the camera, the controller may determine if the classification is associated with clockwise drum rotation, counter-clockwise drum rotation, or no drum rotation. If the controller determines that the drum is rotating and in the proper direction at step 220, then the laundry cycle continues at step 230. At step 240, the controller program is paused for a period of time before repeating step 220. In the preferred embodiment, the period of time during which the program is paused is 1 second. However, this particular timing is not required. Any suitable period of time may be used as long as the delay would not permit the laundry to continue operating after cessation of drum rotation where doing so would present a safety risk or would otherwise result in damage to the appliance. So long on the drum continues to rotate, method 200 may loop between steps 220, 230, and 240 periodically until the laundry cycle ends.

Alternatively, if the controller determines that drum rotation fault, such as the drum not rotating or rotating in the wrong direction, at step 220, then method 200 may adjust at least one operating parameter of the laundry appliance. For example, at step 250, the laundry appliance may edit a service record to indicate the fault. Editing of the service record may take the from of recording the fault in a diagnostic history, such as a cycle history or usage profile. Additionally, at step 260, the controller may search the service records for prior indications of drum rotation faults to assess the fault frequency. A threshold parameter for allowably fault frequency may then be checked to determine if the number of prior drum rotation faults exceeds the threshold. The threshold may be as low as one in the preferred embodiment. However, depending on frequency of errors in the image classification process, which may be elevated particularly during the period of time in which the artificial intelligence is trained, it may be desirable in some cases for the fault threshold to be higher than one to ensure that faulty identification does not lead to disabling of the appliance.

At step 270, if the number of prior drum rotation faults is below the threshold parameter, the laundry cycle may continue. Additionally, the amount of time remaining for the current cycle may be paused for a period of time to reflect that reduced effectiveness of the appliance in the absence of drum rotation. Further, in the case of a dryer appliance, the heater may be disabled to prevent overheating of the appliance.

Alternatively, at step 280, if the number of prior drum rotation faults is above the threshold parameter, the fault will be considered a critical fault. In that case, the laundry appliance is disabled, for example, by immediately ending the cycle and, in the case of a dryer appliance, disabling the heater. Additionally, an indicator on a user interface may be activated to alert users of the fault and the need for assessment or repair of the appliance.

FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using dryer appliance 10 as an example, it should be appreciated that these methods may be applied to the operation of any suitable laundry appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a laundry appliance, the laundry appliance comprising a drum rotatably mounted within a cabinet, the drum defining a chamber for receipt of clothes, a heater, and a camera for monitoring rotation of the drum, the method comprising:
   obtaining one of more images of the drum using the camera;
   performing image classification using a machine learning image recognition process;
   determining whether the image classification indicates a drum rotation fault; and
   adjusting at least one operating parameter of the laundry appliance if a drum rotation fault is detected based on the image classification, wherein the laundry appliance further comprises a heater and adjusting at least one operating parameter of the laundry appliance if a drum rotation fault is detected based on the image classification includes disabling the heater.

2. The method of claim 1, wherein the machine learning image recognition process comprises at least one of a convolution neural network ("CNN"), a region-based convolution neural network ("R-CNN"), a deep belief network ("DBN"), or a deep neural network ("DNN") image recognition process.

3. The method of claim 1, wherein adjusting at least one operating parameter of the laundry appliance if a drum rotation fault is detected includes editing a service record indicating the drum rotation fault.

4. The method of claim 3, wherein adjusting at least one operating parameter of the laundry appliance if a drum rotation fault is detected includes disabling operation of the laundry appliance when the service record search indicates one or more prior cycles with a drum rotation fault.

5. The method of claim 1, wherein adjusting at least one operating parameter of the laundry appliance if a drum rotation fault is detected includes searching a service record for prior indications of the drum rotation fault.

6. The method of claim 5, wherein adjusting at least one operating parameter of the laundry appliance if a drum rotation fault is detected includes adjusting the length of the current cycle when the service record search indicates no prior cycles with a drum rotation fault.

7. The method of claim 1, wherein the method is repeated periodically during operation of the laundry appliance.

8. A method of operating a laundry appliance, the laundry appliance comprising a drum rotatably mounted within a cabinet, the drum defining a chamber for receipt of clothes, a heater, and a camera for monitoring rotation of the drum, the method comprising:
   obtaining one of more images of the drum using the camera;
   performing image classification using a machine learning image recognition process;
   determining whether the image classification indicates a drum rotation fault; and
   adjusting at least one operating parameter of the laundry appliance if a drum rotation fault is detected based on the image classification, wherein adjusting at least one operating parameter of the laundry appliance if a drum rotation fault is detected based on the image classification includes searching a service record to identify a fault frequency and disabling the heater if the fault frequency exceeds a threshold.

9. The method of claim 8, wherein adjusting at least one operating parameter of the laundry appliance if a drum rotation fault is detected includes editing the service record indicating the drum rotation fault.

10. The method of claim 8, wherein adjusting at least one operating parameter of the laundry appliance if a drum rotation fault is detected includes adjusting the length of the current cycle when the fault frequency is below a threshold.

11. The method of claim 10, wherein adjusting at least one operating parameter of the laundry appliance if a drum rotation fault is detected includes disabling operation of the laundry appliance when the fault frequency indicates one or more prior cycles with a drum rotation fault.

12. The method of claim 8, wherein the method is repeated periodically during operation of the laundry appliance.

13. The method of claim 8, wherein determining whether the image classification indicates a drum rotation fault includes determining if the drum is rotating in a proper direction.

14. The method of claim 8, further including determining the level of saturation of the one or more images.

15. The method of claim 14, wherein the laundry appliance further includes a light and obtaining the one or more images is performed with the light off.

16. The method of claim 15, further including activating the light for obtaining one or more second images based on the determinations of the level of saturation of the one or more images.

17. The method of claim 8, further including
transmitting the image to a remote server for analysis; and
receiving analytic feedback from the remote server.

* * * * *